United States Patent [19]
Dye

[11] 3,798,820
[45] Mar. 26, 1974

[54] DECOY

[75] Inventor: Harry B. Dye, Seattle, Wash.

[73] Assignee: Dye-Call, Inc., Seattle, Wash.

[22] Filed: May 22, 1972

[21] Appl. No.: 255,591

[52] U.S. Cl. .................................................. 43/3
[51] Int. Cl. ........................................... A01m 33/06
[58] Field of Search ................................... 43/2, 3

[56] References Cited
UNITED STATES PATENTS

| | | | |
|---|---|---|---|
| 3,055,134 | 9/1962 | Archer | 43/3 |
| 2,555,815 | 6/1951 | Rawlins et al. | 43/3 |
| 2,630,093 | 3/1953 | Toal | 43/3 |
| 3,050,895 | 8/1962 | Bratland et al. | 43/3 |
| 3,079,719 | 3/1963 | Muszynski | 43/3 |
| 3,149,433 | 9/1964 | Hagen | 43/3 |

*Primary Examiner*—Louis G. Mancene
*Assistant Examiner*—Robert F. Cutting
*Attorney, Agent, or Firm*—Christensen, O'Connor, Garrison & Havelka

[57] ABSTRACT

Disclosed is a waterfowl decoy including an elongated, buoyant body, a thin, shallow keel projecting downwardly from the body and extending along the longitudinal center line thereof, and fin-like, ground-engaging supports projecting downward from the body and extending along the lateral center line thereof generally perpendicular to the keel. The lowermost surfaces of the supports and keel are substantially coplanar and are so spaced apart that the decoy will remain erect when set upon land or ice. The central portions of the keel and the supports are recessed from their respective lowermost edges so as to accommodate an annular decoy anchor having anchor line wrapped thereabout. The anchor is held in the recess by a wedging action between cooperating surfaces disposed on the keel and the supports. The recessed central portions of the keel and fins are of sufficient depth so that the anchor and anchor line wrapped thereabout are both held above the lowermost surfaces of the keel and supports, such that the decoy can be employed on land or ice with the anchor stowed on the underside thereof.

27 Claims, 6 Drawing Figures

PATENTED MAR 26 1974 3,798,820
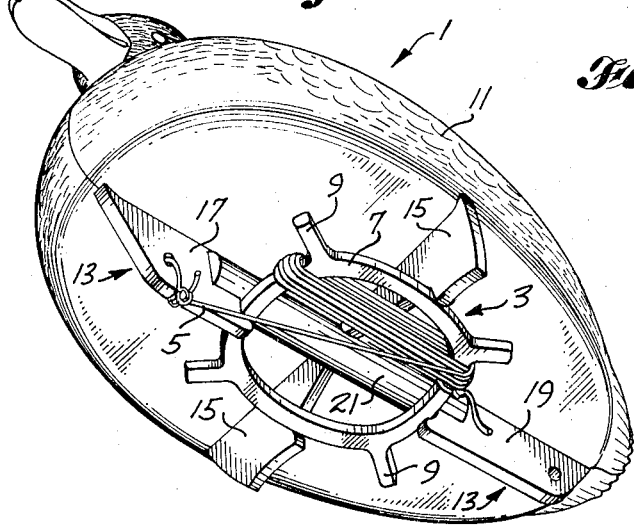
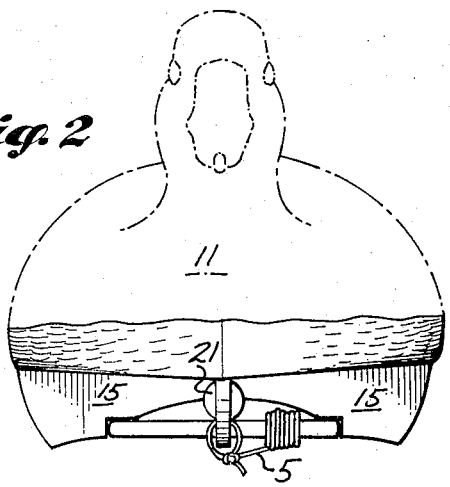
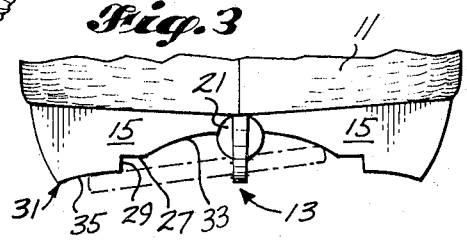
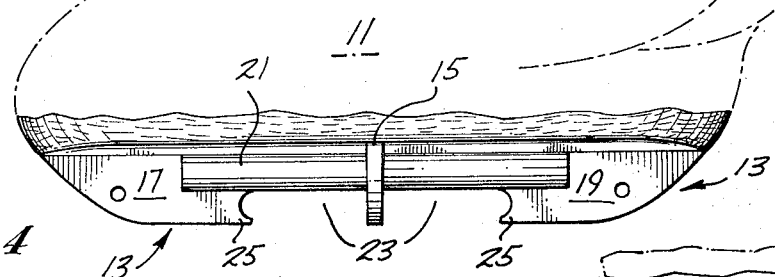
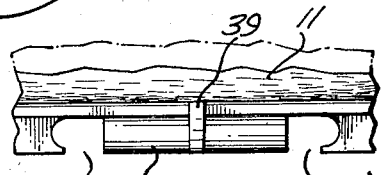
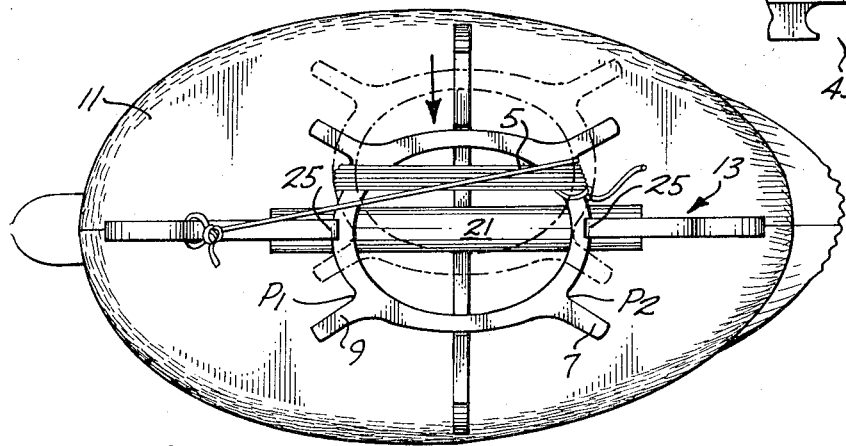

DECOY

BACKGROUND OF THE INVENTION

This invention relates to buoyant waterfowl decoys, i.e., decoys for ducks, coots, geese and the like. One aspect of this invention more particularly relates to decoys which can be used both on water and on land and ice.

Most commercial decoys for use on water are provided with a keel projecting downwardly from the underside of the decoy substantially along the length thereof. The purpose of the keel is to hydrodynamically stabilize the decoy against unlifelike sidways movement on the water when it is influenced by winds, waves and currents and to prevent or reduce unlifelike rotation of the decoy about its center. The keel sometimes includes a stabilizing weight designed to render the decoy self-uprighting and to reduce unnatural bobbing or bouncing of the decoy. Although keels of the type just described contribute much to the lifelike motion of decoys when they are used on water, they can be of considerable annoyance when the decoys are used on land or ice, since the decoys tend to tilt unnaturally to one side. The hunter is thus faced with the task of placing rocks, dirt or the like under the decoy so as to maintain it upright. Location of suitable materials in the vicinity where the decoys are to be set and placement under the decoys of such materials as can be found are unpleasant and time consuming tasks, particularly when attempted in the dark, when the ground is frozen and/or when suitably sized rocks or other items are unavailable.

Decoys used on water must be anchored in some fashion. Typically lead anchors attached to the end of a suitable length of line are connected to each decoy or to one or more decoys in an interconnected set. When the decoys are to be removed from a hunting site, the anchor lines are normally wrapped around the anchor or the body of the decoy. This method of stowing the lines is less than convenient, however, since the lines frequently unwind from the decoy or anchor when the decoys are handled or transported together in a sack or the like, the usual result being that lines and anchors from different decoys become hopelessly entangled. Also, when the decoys are to be used on land or ice, the hunter must either detach the lines and anchors from the decoys or face the problem of concealing both under the decoys.

There have been proposed various types of decoy anchors which can be placed over the head or on the back of a decoy with the anchor line wrapped around either the anchor or the decoy (see, for example, U.S. Pat. Nos. 2,520,233, 3,050,895 and 3,149,433). These types of anchors reduce tangling of lines to one degree or another, but have the serious disadvantage of frequently causing damage to the painted finish on the decoys. They also do not diminish the problem of concealment of the anchors and lines when the decoys are used on land or ice.

Godward U.S. Pat. No. 1,444,342 and Higgins U.S. Pat. No. 2,368,834 disclose decoys having line and anchor storage devices on their undersides. The Godward decoy has a conical opening extending into the bottom of the decoy body for receiving matching, conical anchor. The anchor is retained in the opening by the anchor line which is wrapped around a combined "keel" and cleat attached to the bottom of the decoy. Although this arrangement provides one solution to the line and anchor storage problem, the Godward decoy would still be substantially as difficult to use on land or ice as those decoys having conventional keels. Also, it would appear likely that at subfreezing temperatures the anchor would become frozen in the mentioned opening if stowed therein while wet. Furthermore, the combined metal keel and cleat of the Godward decoy is wide and very shallow and thus would be of doubtful value in hydrodynamically stabilizing movement of the decoy when influenced by winds and currents.

The Higgins patent referred to above discloses a decoy having a weighted, diamond-shaped frame supported horizontally under the decoy by downwardly projecting brackets secured to the bottom of the decoy body. When the decoy is not in use or is used on land or ice, the line is wrapped about the brackets and the anchor is allowed to dangle through the center of the diamond-shaped frame. Higgins discloses that the frame serves as a counterweight when the decoy is used on water and as a stand for maintaining the decoy upright on land or ice. The Higgins device, however, does not provide for any positive securement of the anchor to the frame structure or the decoy bottom. It also has no keel for hydrodynamically stabilizing motion of the decoy on water. Furthermore, neither of the structures of Godward or Higgins could be conveniently formed integrally with the decoy body by plastic molding methods.

OBJECTS OF THE INVENTION

It is an object of this invention to provide a floating waterfowl decoy having a center keel for hydrodynamically stabilizing the decoy, which decoy can be conveniently used both on water and upon the ground or ice. It is another object of this invention to provide a waterfowl decoy of the type described which will accommodate a line-enwrapped decoy anchor secured to the underside thereof. Still another object is to provide a waterfowl decoy on the underside of which a flat, annular decoy anchor can be securely stowed, and which with the anchor stowed on its underside will remain erect when placed on land or ice. It is a further object to provide a waterfowl decoy which will not only achieve the foregoing objects, but also exhibit likelike movements when used on water influenced by wind, wave and/or current action. Another object is to provide a decoy which, when propelled head-end-first through water, will provide a lifelike wake, the outer edges of which emanate from proximate the ends of the lateral center line of the decoy. Still another important object of this invention is to provide a waterfowl decoy which achieves the foregoing objects and which is so designed that substantially all elements of which it is comprised can be integrally formed by economical plastic molding methods.

SUMMARY OF THE INVENTION

In one aspect, this invention is directed to a waterfowl decoy which can be used conveniently both on water and on land or ice. The decoy has an elongated body, a thin, shallow keel projecting downwardly from the bottom of the body along its longitudinal center line. The keel includes segments extending forwardly and rearwardly of the center of the bottom of the decoy body. The decoy also includes two ground-engaging supports projecting downwardly from the bottom of the body on opposite sides of the keel. The lowermost surfaces of the supports and of the forward and rearward segments of the keel are substantially coplanar and are so spaced apart on the bottom of the body as to provide stable support for the decoy when it is placed on land or ice.

This invention is also directed to the combination of a buoyant decoy and an anchor therefor, the anchor being stowable on the underside of the decoy when it (the anchor) is not being used. More particularly, the decoy has an elongated body and a center keel of the type described immediately above. The keel has an opening extending therethrough from side-to-side. The keel and the anchor are cooperatively formed such that the anchor can be releasably held within the opening. Preferably the decoy also includes ground-engaging supports as described above.

BRIEF DESCRIPTION OF THE DRAWINGS

FIG. 1 is an isometric view of the underside of a decoy constructed according to this invention with a decoy anchor stowed on the underside thereof.

FIG. 2 is a front view of the decoy-anchor combination of FIG. 1.

FIG. 3 is a partial front view of the decoy of FIG. 1 with the anchor removed.

FIG. 4 is a side view of the decoy of FIG. 1 with the anchor removed.

FIG. 5 is a bottom view of the decoy-anchor combination of FIG. 1.

FIG. 6 is a partial side view of the keel of another decoy according to this invention.

DETAILED DESCRIPTION OF THE DRAWINGS AND PREFERRED EMBODIMENTS

Referring to FIGS. 1-5 of the drawings, there is shown in combination a buoyant, floatable decoy 1 and a planar anchor 3 stowed on the underside of the decoy. The decoy and anchor are interconnected by means of an anchor line 5, most of which is wrapped around the anchor. The anchor is of a well known variety heretofore stowed on decoys in the over-the-head manner discussed previously. The anchor comprises a rim 7, the outer periphery of which is annular, and, more particularly, elliptical in shape. The anchor preferably has an open center and narrow rim, as shown, so that it is large enough to facilitate rapid winding of the line thereabout but not excessive in weight. The spokes 9 projecting radially outward from the ends of the rim function to prevent the anchor line from slipping off the rim.

The decoy comprises a generally elongated body 11 resembling a duck. Projecting downwardly from the bottom of the decoy body along the longitudinal center line thereof is a stabilizing keel 13 for hydrodynamically stabilizing the decoy as described previously. It will be noted that the thickness of the keel is small compared to its depth and that the keel is thin and shallow compared to the decoy body. The keel preferably extends substantially the full length of the bottom of the body, as shown, so as to maximize its stabilizing effect.

Two fin-like, ground-engaging supports 15 also project downwardly from the bottom of the decoy body on opposite sides of the keel. It will be noted that the lowermost termini of the supports and the lowermost termini of the keel are substantially coplanar and are spaced apart such that they form a four-point pedestal on which the decoy can be stably supported when placed upright on a level, solid surface. The supports 15 are preferably disposed substantially parallel to and proximate the lateral center line of the decoy body so that the point at which the supports and keel intersect is situated generally in line with the center of gravity of the decoy.

Referring in more detail to the keel 13, it includes first and second sections 17 and 19 respectively extending forwardly and rearwardly of the lateral center line of the decoy and terminating proximate the forward and rearward ends of the bottom of the decoy body. The lowermost edges of these two sections are straight and lie in the same plane. Extending between the forward and rearward sections of the keel and defining the center section 21 of the keel is an enlarged, generally cylindrical portion which accommodates a cylindrical, stabilizing weight (not visible), the purpose of which is to lower the center of gravity of the decoy so that it is self-uprighting when used on water and so that it will not exhibit an unlifelike rocking motion on water. The ends of the cylindrical portion are included in the forward and rearward sections 17 and 19 of the keel. It will be observed that the lower edge of the center section of the keel is recessed upwardly with respect to the adjoining lower edges of the forward and rearward sections so as to provide in the keel an elongated opening or slot 23 extending from side-to-side therethrough. In the preferred embodiment of FIGS. 1-5, the slot also opens to the bottom of the keel; as explained hereinafter, it is not essential that the slot open downwardly. The opening of the slot toward the bottom of the keel is shorter than and centered relative to the side openings thereof such that the keel includes inwardly directed projections 25 at the ends of the slot, these projections functioning as detent means as described subsequently.

Referring now to the fin-like, ground-engaging supports 15, each preferably extends from proximate the keel to proximate the side edge of the bottom of the decoy body. For reasons explained subsequently, (and as can be best seen by reference to FIG. 3), the lower edge of each support slants gradually downward from proximate the keel to a substantially horizontal downwardly facing ledge 27 and an inwardly facing shoulder 29 and then gradually slants downwardly from the shoulder to the lowermost terminus of the support at 31. Together, the two fin-like supports form a "cross-keel" extending substantially the full width of the bottom of the decoy body. It has been found that such a cross-keel causes the decoy to move through water more smoothly and, hence, in a more lifelike manner than do decoys having only center keel 19. More specifically, the cross-keel reduces the tendency of the decoy to rotate unnaturally about its center when affected by winds. Also, when the decoy moves headfirst relative to the water, i.e., when propelled by winds or when oriented against a current flow, the outer ends of the cross-keel cause the decoy to produce a more lifelike wake, the outer edges of which emanate from proximate the ends of the lateral center line of the decoy, i.e., the widest part of the decoy body. Most, if not all, commercially available decoys produce somewhat unnatural wakes emanating from nearer their tail ends. For maximum effectiveness in reducing unnatural movement of the decoy, the cross-keel should be shaped and disposed symmetrically with respect to the main keel of the decoy.

The decoys of this invention are preferably manufactured from polyethylene powder employing hollow molds which are simultaneously heated with hot air and rotated in all directions until a uniform coating of fused polyethylene is formed on all interior surfaces of the mold. Preferably, the keel and the ground-engaging supports of the decoy are sufficiently thick and rigid so as to stably support the decoy on land or ice and securely hold the anchor when stowed as described presently.

Stowing of the line-enwrapped anchor on the underside of the decoy of this invention is particularly easy. The line is wrapped on one side of the anchor as shown. As most easily seen with reference to FIGS. 3 and 5, the distance between points $P_1$ and $P_2$ on the outer periphery of the anchor rim is substantially less than the distance between the inner ends of the projections 25 at the ends of the slot 23. With the decoy held upsidedown (the immediately following description assumes this orientation of the decoy), the anchor can thus be laid in the slot as shown by dotted lines in FIGS. 3 and 5 with the line-free side of the rim resting on curved surface 33 (see FIG. 3) on the lower edge of one of the supports 15 and the opposite side resting on curve surface 35 of the other support. The anchor can then be pushed in the direction shown by the arrow in FIG. 5 (with a slight downward pressure as well) until the sides of the rim are in contact with the ledges and the ends of the rim are wedged between the ends of the slot. The spacing between the ledges 27 is substantially equal to the width of the rim and the length of the slot 23 is slightly less than the length of the anchor rim. (The anchor spokes nearest the head end of the decoy are not shown in FIGS. 2 and 3 so that the engagement between the supports and rim of the anchor can be more clearly shown.) As the anchor is stowed in this manner, the line-free side of the rim rides up curved surface 33 on one support while the opposite side of the rim rides down curved surface 35 on the other support. The plane in which the ledges 27 lie and the plane in which the upper surfaces of the projections 25 (still assumes that the decoy is upsidedown) are spaced apart slightly less than the depth of the anchor rim so that the ledges bear down on the sides of the rim. Shoulders 29 on the supports serve as stops to assure that the anchor cannot be easily dislodged from its towed position. So as to obtain good frictional engagement between the keel and anchor, the ends of the slots are curved to match the curvature of the rim and the depth of the slot ends, i.e., the distance between the lower edge of the cylindrical portion 21 and the upper edge of the projections 25, is preferably slightly smaller than the depth of the rim.

The projections 25 at the ends of the slot 23 can be made sufficiently flexible (or other detent means can be substituted therefor) so that the anchor can be "snapped" downwardly (with decoy upsidedown) into its stowed position. The anchor, however, is not held as securely if the projections are flexible enough to permit such a snap fit and flexible projections are less durable.

The keel structure shown in FIGS. 1-5 is preferred for use in large decoys (e.g., those representing mallards, black ducks and geese) since keels on these decoys can be sufficiently deep (e.g., 1 - 1½ inches) to permit location of the anchor-receiving slot below the cylindrical portion of the keel. In FIG. 6, there is shown a keel construction which is preferred for use in smaller and hence narrower decoys (e.g., those representing teal and coots). Such small decoys desirably have shallower keels (e.g., five-eighth inch) so that when used on land or ice or in clear water the keels are less noticeable to waterfowl flying overhead. The ground-engaging supports 39 in the structure of FIG. 6 are identical to those shown in FIGS. 1-5 except that they are proportionately shallower.

The center keel 41 extends the full length of the decoy body 43 and is narrow and shallow compared thereto. The slot 45 in the keel is preferably of the same shape and dimensions as slot 23 in the decoy of FIGS. 1-5 so that the anchor 3 can be employed in combination with large and small decoys. However, the slot 45 (FIG. 6) is interrupted by a short, cylindrical portion 47 of the keel which, as in the decoy of FIGS. 1-5, contains a cylindrical stabilizing weight (not visible). The cylindrical portion 47 of the keel 41 of FIG. 6 (and the weight contained therein) is about one-half the length of the corresponding portion 21 of the keel 13 shown in FIGS. 1-5; their diameters are about equal. The cylindrical portion of the keel is disposed centrally in the slot so that the rim of an annular anchor, such as shown in FIGS. 1, 3 and 5, can be held in the slot as previously described. The cylindrical portion of the keel of FIG. 6 fits within the open center of anchor 3 and does not interfer with stowing of the anchor 3 as described above.

Although the present invention has been described in relation to the presently preferred embodiments thereof, it will be apparent that one skilled in the art will be able to effect various modifications, substitutions of equivalents and other changes in those embodiments, without departing from the spirit and scope of this invention. For example, the keel shown in FIGS. 1-5 could be modified so that slot 23 opens only to the sides thereof; an annular anchor of the type shown in FIGS. 1, 2 and 5 but having shorter spokes could be inserted sideways into the modified slot and wedged securely therein. The ground-engaging supports 15 are particularly advantageous and preferred since they function to support and stabilize the decoy when used on land or ice, to stabilize the decoy when used on water and to cooperate with the keel to securely hold the anchor in its stowed position. Notwithstanding these advantages and at the sacrifice of the last two just-mentioned functions, these supports would not be essential if one employed an anchor similar to that shown in the drawings but having downwardly projecting, ground-engaging "legs" spaced apart on the rim thereof on opposite sides of the keel so that in its stowed position the anchor would stabilize the decoy when used on land or ice. Such an anchor could be held in its stowed position by the keel only and/or by other means disposed on the underside of the decoy. Yet another possible modification within the spirit and scope of this invention could involve the use of two catamaran-type keels extending longitudinally of the decoy and spaced apart on opposite sides of the decoy center line. Such a construction would complicate manufacture of the decoy, but the keels would stabilize the decoy on water and land and could be recessed at their centers to accommodate and hold an annular anchor as described herein.

What is claimed is:

1. In combination, a buoyant waterfowl decoy and an anchor therefor stowable on the underside thereof, said decoy comprising a generally elongated body; means defining a substantially vertical keel projecting downwardly from the bottom of said body substantially on the longitudinal center line of the bottom of said body, said keel being thin and shallow compared to said body, and said keel having first and second segments respectively extending forwardly and rearwardly of the lateral center line of the bottom of said body and said keel having an opening extending therethrough from side-to-side, said opening being located between said first and second segments, and said opening and said anchor being cooperatively formed such that at least a portion of said anchor can be releasably held in a stowed position within said opening, and said decoy further comprising first and second ground engaging supports on opposite sides of said keel; the lowermost termini of said supports and said first and second segments of said keel being substantially coplanar and spaced apart on the bottom of said body as to provide stable support for said decoy when placed upright on a level, solid surface.

2. The combination of claim 1 wherein said ground-engaging supports are positioned proximate said lateral center line.

3. The combination of claim 2 wherein each of said supports comprises a substantially vertical fin extending parallel to said lateral center line.

4. The combination of claim 3 wherein said fins extend from proximate said keel to proximate the sides of said body.

5. The combination of claim 3 wherein said anchor is annular in shape and wherein said fins and keel include cooperating surfaces between which the rim of said anchor is frictionally engaged and releasably held in a substantially horizontal position.

6. The combination of claim 5 wherein said keel includes detent means bordering the said cooperating surfaces, said detent means extending under and gripping the rim of said anchor.

7. The combination of claim 5 wherein said opening in said keel is an elongated slot extending lengthwise of said keel and opening to the sides and bottom thereof, the length of said slot being substantially equal to a first rim-to-rim dimension of said anchor and the depth of said slot being at least equal to the thickness of the rim of said anchor, whereby, when said anchor is in its stowed position, the lowermost surface thereof is located above the lowermost termini of said supports and said first and second keel sections.

8. The combination of claim 7 wherein the spacing between said cooperating surfaces on said fins is substantially equal to a second rim-to-rim dimension of said anchor generally perpendicular to said first rim-to-rim dimension.

9. The combination of claim 7 wherein said anchor is elliptical in shape and the length of said slot is substantially equal to the length of said anchor.

10. The combination of claim 9 wherein the spacing between said cooperating surfaces on said fins is substantially equal to the width of said anchor.

11. The combination of claim 10 wherein said anchor has an opening in the center thereof and wherein a portion of said keel extends downwardly into said opening.

12. In combination, a buoyant waterfowl decoy and an annular anchor therefor stowable on the underside thereof, said decoy comprising a generally elongated body; and means defining a substantially vertical keel projecting downwardly from the bottom of said body substantially on the longitudinal center line of the bottom of said body, said keel being thin and shallow compared to said body, having first and second segments respectively extending forwardly and rearwardly of the lateral center line of the bottom of said body and having an elongated slot extending lengthwise thereof and from side-to-side therethrough, said slot being located between said segments and being of a length substantially equal to a first rim-to-rim dimension of said anchor, said anchor being releasably held in said slot in a substantially horizontal position.

13. The combination of claim 12 wherein said slot opens to the bottom of said keel and wherein said keel includes a detent means projecting inwardly at the ends of the slot along the bottom of said keel and under said anchor to thereby hold said anchor in said slot.

14. In combination, a buoyant waterfowl decoy and an annular decoy anchor, said decoy comprising a generally elongated body; a substantially vertical keel projecting downwardly from the bottom of said body substantially on the longitudinal center line of the bottom thereof, said keel being thin and shallow compared to said body and having first and second straight, substantially coplanar lower edges respectively disposed forward and rearward of the lateral center line of the bottom of said body and having an elongated notch extending between said first and second lower edges, said notch opening to the sides and bottom of said keel and being of a length substantially equal to a first rim-to-rim dimension of said anchor, said keel including inwardly directed projections along the bottom thereof at each end of said slot for engaging and holding the underside of the rim of said anchor; and first and second ground-engaging fins extending on opposite sides of and perpendicular to said keel substantially parallel to and proximate the lateral center line of the bottom of said body, the lower edge of each of said fins slants downwardly from said keel to a substantially horizontal, downwardly facing ledge and a substantially vertcal, inwardly facing shoulder, and from said shoulder slants further downwardly to and terminates at a level substantially coplanar with said first and second lower edges of said keel, the ledges on said fins being spaced apart a distance substantially equal to a second rim-to-rim dimension of said anchor perpendicular to said first dimension, whereby said anchor can be stowed on the underside of said decoy with the rim thereof frictionally engaged and releasably held between the ends of said slot and said ledges and whereby with said anchor so stowed said decoy will be stably supported by said fins and keel when placed upright on a level surface.

15. A buoyant waterfowl decoy comprising a generally elongated body; a substantially vertical keel projecting downwardly from the bottom of said body on the longitudinal center line of the bottom of said body, said keel being thin and shallow compared to said body and having first and second segments respectively extending forwardly and rearwardly of the lateral center line of the bottom of said body; and first and second ground-engaging supports projecting downwardly from the bottom of said body on opposite sides of said keel; the lowermost termini of said supports and said first and second segments of said keel being substantially coplanar and so spaced apart on the bottom of said body as to provide stable support for said decoy when placed upright on a level, solid surface.

16. The decoy of claim 15 wherein said ground-engaging supports are positioned proximate said lateral center line.

17. The decoy of claim 15 wherein each of said supports comprises a substantially vertical fin extending substantially parallel to and proximate said lateral center line.

18. The decoy of claim 17 wherein said fins extend from proximate said keel to proximate the sides of said body.

19. The decoy of claim 18 wherein said keel and said fins have downwardly opening recesses therein and means for frictionally engaging and releasably holding an annular decoy anchor within said recesses.

20. The decoy of claim 15 wherein the lowermost edge of each of said first and second keel sections includes a straight section, said straight sections being substantially coplanar with one another and with the lowermost termini of said supports.

21. The decoy of claim 15 wherein said keel further includes a downwardly opening recess between said first and second segments and means for frictionally engaging and releasably holding an annular decoy anchor within said recess.

22. In combination, a buoyant generally flat-bottomed waterfowl decoy and an anchor therefor, said decoy comprising a generally elongated body; means defining a substantially vertical keel projecting downwardly from the bottom of said body substantially on the longitudinal center line of the bottom of said body, said keel being thin and shallow compared to said body, having first and second segments respectively extending forwardly and rearwardly of the lateral center line of the bottom of said body and having an anchor-receiving opening extending therethrough from side-to-side thereof; and anchor retainer means for releasably holding said anchor in a stowed position in said opening below the bottom of said decoy body.

23. In combination, a buoyant waterfowl decoy and an anchor therefor, said decoy comprising a generally elongated body, a vertically oriented keel depending from the bottom of said body and having an anchor-receiving recess therein, said recess opening crosswise the vertical plane of said keel, said decoy further comprising anchor retainer means for releasably holding said anchor in a stowed position in said recess below the bottom of said decoy body.

24. The combination according to claim 23 wherein the anchor is generally planiform and is stowed in generally coparallel juxtaposition with the bottom of said decoy body.

25. The combination according to claim 24 wherein said retainer means are formed on the keel.

26. The combination according to claim 24 wherein said recess opens to the bottom edge of said keel.

27. The combination according to claim 24 wherein there are ground engaging supports depending from the bottom of the decoy to each side of said keel and forming a four-point pedestal therewith, said anchor being stowed in said recess above the bottom edge of said keel and being releasably engaged with said supports and said keel.

* * * * *